US012617033B2

(12) United States Patent
Bayer et al.

(10) Patent No.: US 12,617,033 B2
(45) Date of Patent: May 5, 2026

(54) MANUFACTURING DEVICE FOR ELECTROCHEMICAL MACHINING OF A COMPONENT, IN PARTICULAR A TURBINE COMPONENT, METHOD FOR ELECTROCHEMICAL MACHINING OF A COMPONENT, AND COMPONENT

(71) Applicant: MTU Aero Engines AG, Munich (DE)

(72) Inventors: Kilian Bayer, Gerolsbach (DE);
Benjamin Steininger, Penzberg (DE);
Gazmen Dzemajili, Munich (DE)

(73) Assignee: MTU Aero Engines AG, Munich (DE)

( * ) Notice: Subject to any disclaimer, the term of this patent is extended or adjusted under 35 U.S.C. 154(b) by 763 days.

(21) Appl. No.: 17/822,797

(22) Filed: Aug. 28, 2022

(65) Prior Publication Data

US 2023/0064929 A1     Mar. 2, 2023

(30) Foreign Application Priority Data

Sep. 1, 2021     (DE) ..................... 10 2021 122 584.1

(51) Int. Cl.
B23H 3/10       (2006.01)
B23H 9/10       (2006.01)
B23H 11/00      (2006.01)
(52) U.S. Cl.
CPC .................. B23H 3/10 (2013.01); B23H 9/10 (2013.01); B23H 11/003 (2013.01); *B23H 2600/10* (2013.01)
(58) Field of Classification Search
CPC ... B23H 3/10; B23H 1/10; B23H 5/14; B23H 7/36; B23H 9/10
See application file for complete search history.

(56)                References Cited

U.S. PATENT DOCUMENTS

| | | | | |
|---|---|---|---|---|
| 5,015,347 | A | | 5/1991 | Kuwabara |
| 5,245,152 | A | * | 9/1993 | McCall ..................... B23H 1/08 |
| | | | | 409/137 |

(Continued)

FOREIGN PATENT DOCUMENTS

| | | | | |
|---|---|---|---|---|
| CH | 672449 A5 | * | 11/1989 | ............... B23H 1/10 |
| DE | 102004057527 B4 | | 6/2007 | |

(Continued)

OTHER PUBLICATIONS

Machine translation of CH672449A5 of Babel et al. (Year: 1989).*

(Continued)

*Primary Examiner* — Brian W Cohen
(74) *Attorney, Agent, or Firm* — Hinckley, Allen & Snyder, LLP; David R. Josephs

(57)                ABSTRACT

The invention relates to a manufacturing device for the electrochemical machining of a component, in particular a turbine component, wherein the manufacturing device comprises at least one machining device, which is set up to remove material of the component in accordance with a predetermined electrochemical machining method. It is provided that the manufacturing device comprises at least one cleaning device, which is set up to spray jets of the electrolyte solution onto the component in accordance with a predetermined jet-spraying method in order to remove a residue layer formed on the component during the predetermined electrochemical machining method.

9 Claims, 3 Drawing Sheets

(56)     References Cited

U.S. PATENT DOCUMENTS

Figure 1:
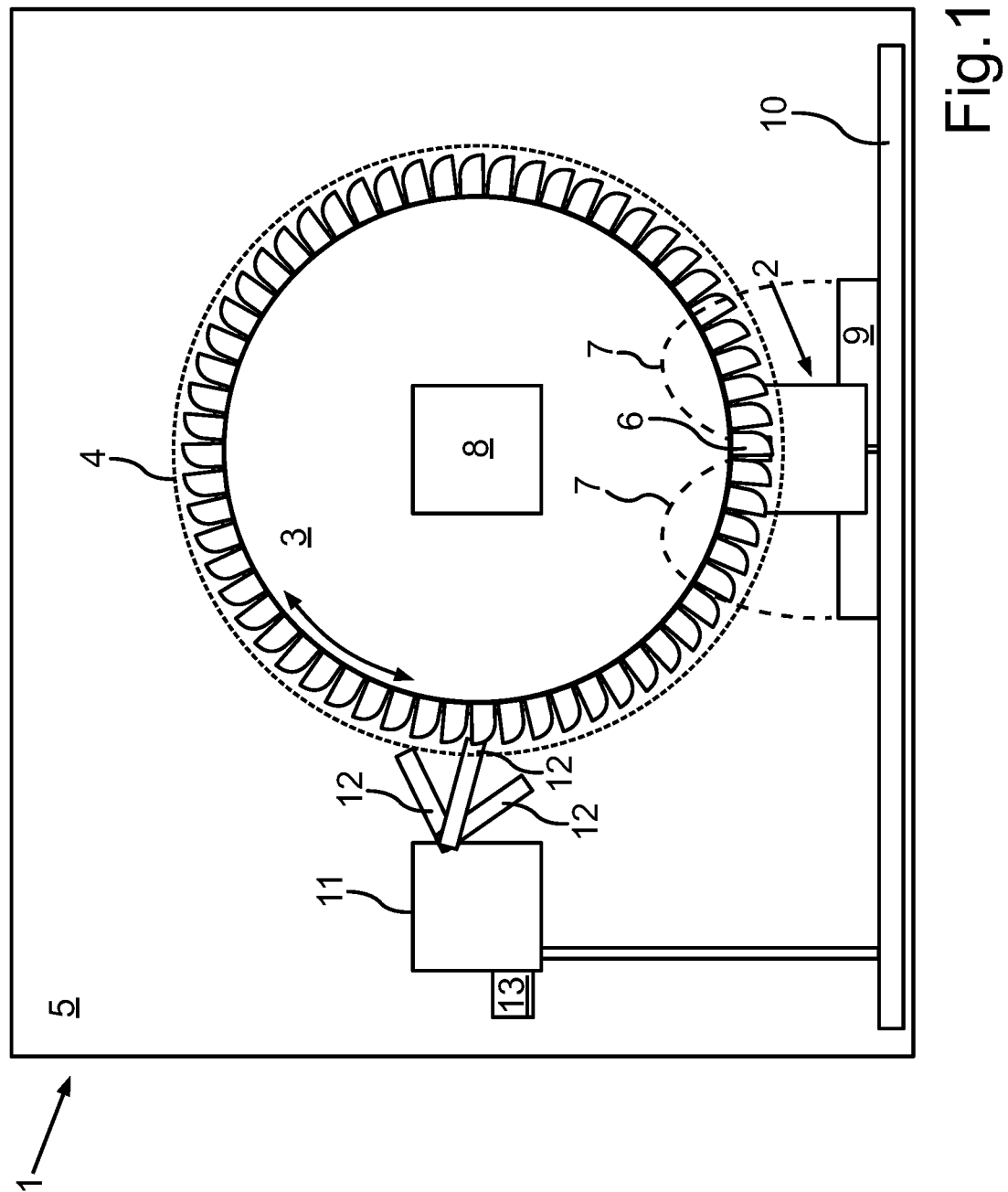

| | | | |
|---|---|---|---|
| 7,153,411 B2 | 12/2006 | Larson et al. | |
| 7,824,526 B2 * | 11/2010 | Yuan | B23H 7/36 |
| | | | 219/69.18 |
| 2005/0218089 A1 * | 10/2005 | Wei | B23H 1/10 |
| | | | 210/171 |
| 2016/0167147 A1 * | 6/2016 | Yoshizaki | B23Q 11/0042 |
| | | | 219/69.11 |

FOREIGN PATENT DOCUMENTS

| | | | |
|---|---|---|---|
| DE | 102019213342 A1 | 3/2021 | |
| EP | 1850995 A2 | 8/2006 | |
| WO | 2006 0910 828 A2 | 8/2006 | |
| WO | 2021013284 A2 | 1/2021 | |

OTHER PUBLICATIONS

"Experimental Study on Electrochemical Machining with Electrolyte Confined by Absorption Material", Procedia CIRP 87 (2020) 263-267, 2020, Natsu, Wataru et al.
"Fabrication of Surface Micro Letters by Electrolyte Jet Mask Machining", Procedia CIRP 95 (2020) 827-832, 2020, Wu, Ming et al.
"Electrolytes In Electrochemical Machining Process", 9th International Symposium on Advances In Electrochemical Science And Technology 2010, Suresh Hanamant Surekar.

* cited by examiner

MANUFACTURING DEVICE FOR ELECTROCHEMICAL MACHINING OF A COMPONENT, IN PARTICULAR A TURBINE COMPONENT, METHOD FOR ELECTROCHEMICAL MACHINING OF A COMPONENT, AND COMPONENT

BACKGROUND OF THE INVENTION

The invention relates to a manufacturing device for the electrochemical machining of a component, in particular of a turbine component, a method for the electrochemical machining of a component, and a component therefor.

Electrochemical treatment methods are employed increasingly in the manufacture of components for turbines. For example, so-called electrochemical machining is known as a method for the exact and very precise machining of surfaces. In electrochemical machining, the component is polarized as the anode in order to machine the surface of the component. A machining device that is intended for machining the component is polarized as the cathode. The component and the machining device are spaced apart by a gap. For this reason, what is involved is a contact-free machining method. The removal of material of the component occurs by electrochemical reactions of the component with an electrolyte solution present in the gap between the component and the machining device. The electrolyte solution can be conveyed through the gap in order to carry away the removed material out of the gap. In conventional operations of electrochemical lowering, distances of the machining device from the component that can lie in the range of 1 to 2 mm are employed. For producing finer structures and forms, the distance can be lowered to values in the range of 10 bis 50 μm and less (precise electrochemical machining).

The electrolyte solutions used contain dissociated ions, which move in a directed manner under the influence of the electric field formed by the anode and the cathode. These components can involve those that are used for the production of certain aircraft engine components or the components of already finished components that are to be cleaned, further processed, or repaired or overhauled by use of the electrolyte solution. These components can involve, for example, blisks (blade integrated disks) made of Ni-based or Ti-based alloys, low-pressure turbine disks, and, in general, all components that are to be etched, coated, or cleaned. For example, in electrochemical metal machining, ((precise) electrochemical machining, (P)ECM), alloy constituents of the component are released by means of electrolysis and dissolve in solution as electrolyte. Depending on the material group, an anodic metal release into an aqueous electrolyte solution suitable for this purpose takes place. The metal cations (for example, $Ni^{2+}$, $Fe^{2+}$, $Fe^{3+}$, $Cr^{6+}$, etc.) that are formed accumulate continuously in the electrolyte solution or else are precipitated directly as metal hydroxide and, for example, are removed from the system by filtration. Normally, for example, a sodium nitrate solution of defined concentration is used for the machining of nickel-based alloys.

However, a residue layer can form on the component during the electrochemical machining of components. The residue layer is in liquid form shortly after the electrochemical machining and can be easily removed. After a period of time, the residue layer dries out and a crust forms on the component that needs to be removed from the component.

In accordance with the prior art at the present time, it is conventional to conclude the electrochemical machining of the entire component before the residue layer is removed in a subsequent step. For cleaning, the component is taken out of a component chamber of the manufacturing device after the electrochemical machining and, as a rule, is processed by means of shot peening in order to remove the residue layer. This subsequent processing of the component, which occurs in a separate device, necessitates a greater manufacturing effort and expense in the manufacture of the component. The increased effort is due to the fact that, after electrochemical machining, the component needs to be removed from the manufacturing device and the shot peening of the component is tedious on account of the hardness of the residue layer that has formed.

Known from the prior art are several apparatuses and/or methods for the electrochemical machining of components, some of which are presented below by way of example.

Disclosed in U.S. Pat. No. 7,153,411 B2 are a method for cleaning and polishing metal alloys and objects that are cleaned or polished thereby. In the method for cleaning and polishing an alloy, which comprises at least one precious metal and at least one nonprecious metal, it is provided that the method comprises steps of immersing the alloy in an electrolytic acid bath, which comprises at least one chelating agent or complexing agent including sulfur, and the application of a plurality of periodic pulse-reverse waveforms.

Disclosed in EP 1 850 995 A2 are a method and a system for electrochemical machining. The electrochemical machining system for machining a component comprises a number of electrochemical machining workstations. A first electrochemical machining workstation machines a first region of the component. A second electrochemical machining workstation machines a second region of the component, which is separate from the first region. It is also possible to use additional electrochemical machining workstations. Each electrochemical machining workstation contains a stationary electrode that delivers electric current for erosion of material from the component. Each electrochemical machining station contains, in addition, an ultrasound transducer for determining the width of the electrolyte between the stationary electrode and the component. The machining of the component in each electrochemical machining workstation is concluded when the width of the electrolyte attains a predefined width.

Described in the publication NATSU, Wataru; H E, Junfeng; IWANAGA, Yu. Experimental Study on Electrochemical Machining with Electrolyte Confined by Absorption Material. Procedia CIRP, 2020, Vol. 87, pp. 263-267, is a method for electrochemical machining using electrolytes enclosed by absorption material. During the machining, the non-metallic absorption material is inserted between the cathodic tool and the anodic component after it has absorbed the electrolyte.

Presented in the publication W U, Ming, et al. Fabrication of Surface Micro Letters by Electrolyte Jet Mask Machining, Procedia CIRP, 2020, Vol. 95, pp. 827-832, is an experimental investigation in which lithography is employed in a mask electrolyte jet machining.

The presentation Surekar, Suresh & Kharche, Wasudeo (2010) Electrolytes in Electrochemical Machining Process deals with the role of electrolyte solutions in electrochemical manufacturing methods.

SUMMARY OF THE INVENTION

An object of the invention is to reduce the effort and expense involved in cleaning a component after an electrochemical manufacturing method.

The object is achieved in accordance with the invention by a manufacturing device for the electrochemical machining of a component, by a method for the electrochemical machining of a component, and by a component in accordance with the present invention. Advantageous embodiments with appropriate enhancements of the invention are discussed in detail below, whereby advantageous embodiments of each aspect of the invention are to be regarded as advantageous embodiments of the other respective aspects of the invention.

A first aspect of the invention relates to a manufacturing device for the electrochemical machining of a component, in particular a turbine component. The turbine component can be a so-called blisk, for example. The manufacturing device comprises at least one machining device, which is set up to remove material of the component in accordance with a predetermined electrochemical machining method. The predetermined electrochemical machining method can involve, for example, electrochemical machining or so-called precise electrochemical machining. It can be provided that the electrochemical machining method comprises a release of alloy constituents of the component. The removed material can be discharged by use of an electrolyte solution or can deposit on the component. During the machining method, a voltage can be applied to the component in order to use it as an anode. The machining device can be provided as a cathode during the machining method. The removal of material can result in the formation of a residue layer on the component.

In order to make possible a removal of the formed residue layer from the component, it is provided that the manufacturing device comprises at least one cleaning device, which is set up to jet-spray the electrolyte solution on the component in accordance with a predetermined jet-spraying method, in order to remove the residue layer formed on the component during the predetermined electrochemical machining method. In other words, the manufacturing device is set up to jet-spray the component after the machining method by means of the cleaning device in order to remove the formed residue layer from the component. The cleaning device is set up to use the electrolyte solution as a jet-spraying agent in the cleaning method.

The invention affords, on the one hand, the advantage that both the electrochemical machining and the cleaning of the component can be carried out by the manufacturing device. In this way, it is not necessary for the component to be transferred to another apparatus after the machining method. In addition, it is possible for a direct cleaning treatment to occur directly after the machining and, accordingly, within a period of time in which the residue layer has not yet dried out. Owing to the conduct of the cleaning method in a timely manner, it is possible to avoid a complicated removal of the dried residue layer by shot peening. The use of the electrolyte solution as a jet-spraying agent makes possible a gentler treatment of the component than in the case of shot peening. Because the electrolyte solution is used, it is also unnecessary to provide an additional collecting basin for collecting the jet-spraying means in the manufacturing device.

The invention also comprises enhancements, by way of which further advantages ensue.

An enhancement of the invention provides that the manufacturing device is set up to shift in position and/or to rotate the component and/or the machining device in order to arrange the component in a predetermined material removal position in relation to the machining device. In other words, the arrangement of the component in the predetermined material removal position is provided for carrying out the removal of material. The material removal position describes a predetermined position of the component in relation to the machining device. In order to attain the predetermined material removal position, the manufacturing device is set up to shift in position and/or to rotate the component and/or the machining device. The manufacturing device can have, for example, an actuator, which is set up to shift in position the component and/or the machining device.

An enhancement of the invention provides that the manufacturing device is set up to shift in position and/or to rotate the component and/or the cleaning device in order to arrange the component in a predetermined cleaning position in relation to the cleaning device. In other words, it is provided that the component is arranged in the predetermined cleaning position in relation to the cleaning device for carrying out the predetermined cleaning method. In order to make this possible, the manufacturing device can be set up to shift in position and/or to rotate the component and/or the cleaning device.

An enhancement of the invention provides that the cleaning device comprises at least one jet-spraying nozzle, which is set up to jet-spray at least one jet of the electrolyte solution on predetermined regions of the component. In other words, the cleaning device has at least one jet-spraying nozzle. The jet-spraying nozzle is provided for jet-spraying the electrolyte solution as jet-spraying agent on the predetermined regions of the component in order to release the residue layer from the component due to the impingement of the solution. For example, the jet-spraying nozzle can emit the jet of electrolyte solution onto the predetermined region of the component by providing a predetermined pressure.

An enhancement of the invention provides that the cleaning device comprises at least two jet-spraying nozzles, wherein the jet-spraying nozzles are aligned with respect to each other in such a way that the jet-spraying directions of the respective jets differ from each other. In other words, it is provided that the cleaning device has at least two jet-spraying nozzles. In this case, it is provided that the jet-spraying nozzles differ from each other, so that the jets emitted by the respective jet-spraying nozzles differ from each other in terms of their directions. The enhancement affords the advantage that differently arranged or aligned surfaces of the component can be jet-sprayed by a particular one of the jet-spraying nozzles. It is thereby possible, for example, to compensate for a shadowing of one surface of the component in the case of one jet-spraying nozzle by another jet-spraying nozzle.

An enhancement of the invention provides that the manufacturing device is set up to rotate the component around at least one predetermined axis in space during the predetermined electrochemical machining method and/or the predetermined cleaning method. In other words, it is provided that the manufacturing device is set up to turn the component during the electrochemical machining and/or the cleaning around the predetermined axis in space. It can be provided, for example, that the electrochemical machining method comprises a removal of material of differently arranged regions of the component during the machining method. It can be provided, for example, that the component is designed as a blisk and, during the predetermined machining method, a rotation of the component occurs in order to machine the individual blades arranged around the disk. Correspondingly, a rotation of the component during the cleaning method can also be provided, in order to successively clean the blades around the disk of the component.

An enhancement of the invention provides that the machining device, the cleaning device, and the component are arranged in a machine chamber of the manufacturing device. In other words, the manufacturing device comprises a machine chamber, wherein what may be involved is a closed chamber, in which the machining device, the cleaning device, and the component are arranged. This affords the advantage thereby that, when switching from the machining method to the cleaning method, an arrangement of the component in another machine chamber is not required.

An enhancement of the invention provides that the cleaning device is set up to change the alignment or positioning of at least one of the jet-spraying nozzles. In other words, it is provided that the cleaning device is set up so as to change the alignment or positioning of the at least one jet-spraying nozzle of the cleaning device. This affords the advantage thereby that differently aligned surfaces of the component can be cleaned by one of the jet-spraying nozzles.

An enhancement of the invention provides that the manufacturing device has a tank and is set up to feed electrolyte solution from the tank to the cleaning device and the machining device. In other words, it is provided that cleaning solution is fed to the cleaning device and the machining device by the same tank. This affords the advantage thereby that a second tank for providing a jet-spraying agent need not be provided.

An enhancement of the invention provides that the manufacturing device is set up to manufacture the component step by step in a plurality of predetermined method steps in accordance with a predetermined manufacturing method. The manufacturing device is set up in a particular one of the method steps to arrange the component in the material removal position and to machine a respective region of the component in accordance with the predetermined machining method and, subsequently, to arrange the component in the cleaning position and to machine the respective region of the component in accordance with the predetermined cleaning method. In other words, the manufacturing device is set up to manufacture the component in accordance with the predetermined manufacturing method. It is provided that the manufacturing method comprises a plurality of manufacturing steps for manufacturing respective regions of the component, as a result of which a sequential manufacture of the component occurs. The manufacturing device is set up in a particular one of the method steps to guide the component into the material removal position in order to remove material in the region that is to be manufactured during the method step by the machining device in accordance with the predetermined machining method. The manufacturing device is set up so that, after the removal of the material from the respective region, the component is shifted in position into the cleaning position. The cleaning device is set up to clean the respective region of the method step of the component in accordance with the predetermined cleaning method. The manufacturing device is set up so that, after a conclusion of the cleaning method of the method step, the respective method step is ended and the next method step is initiated by moving the component in place to the material removal position. This affords the advantage thereby that a cleaning of the respective regions of the component is made possible in a timely manner after the machining.

A second aspect of the invention relates to a method for the electrochemical machining of a component, in particular a turbine component, wherein, by way of a machining device of a manufacturing device, material of the component is removed in accordance with a predetermined electrochemical machining method. It is provided that, by way of a cleaning device of the manufacturing device, an electrolyte solution is jet-sprayed on the component in accordance with a predetermined jet-spraying method, in order to remove a residue layer formed on the component during the predetermined electrochemical machining method.

Further features and the advantages thereof of the second aspect of the invention can be taken from the descriptions of the first aspect of the invention.

A third aspect of the invention relates to a component that is manufactured by a method for the electrochemical machining of the component. The component can be, in particular, a component for a turbine.

An enhancement of the invention provides that the component is designed as a blisk. In other words, what is involved in the case of the component is a blade integrated disk. The blisk is a component that has a disk and blades arranged around the periphery of the disk, whereby what is involved is an integrally material-bonded component.

Further features and the advantages thereof can be taken from the descriptions of the first and second aspects of the invention.

BRIEF DESCRIPTION OF THE DRAWING FIGURES

Figure 2:
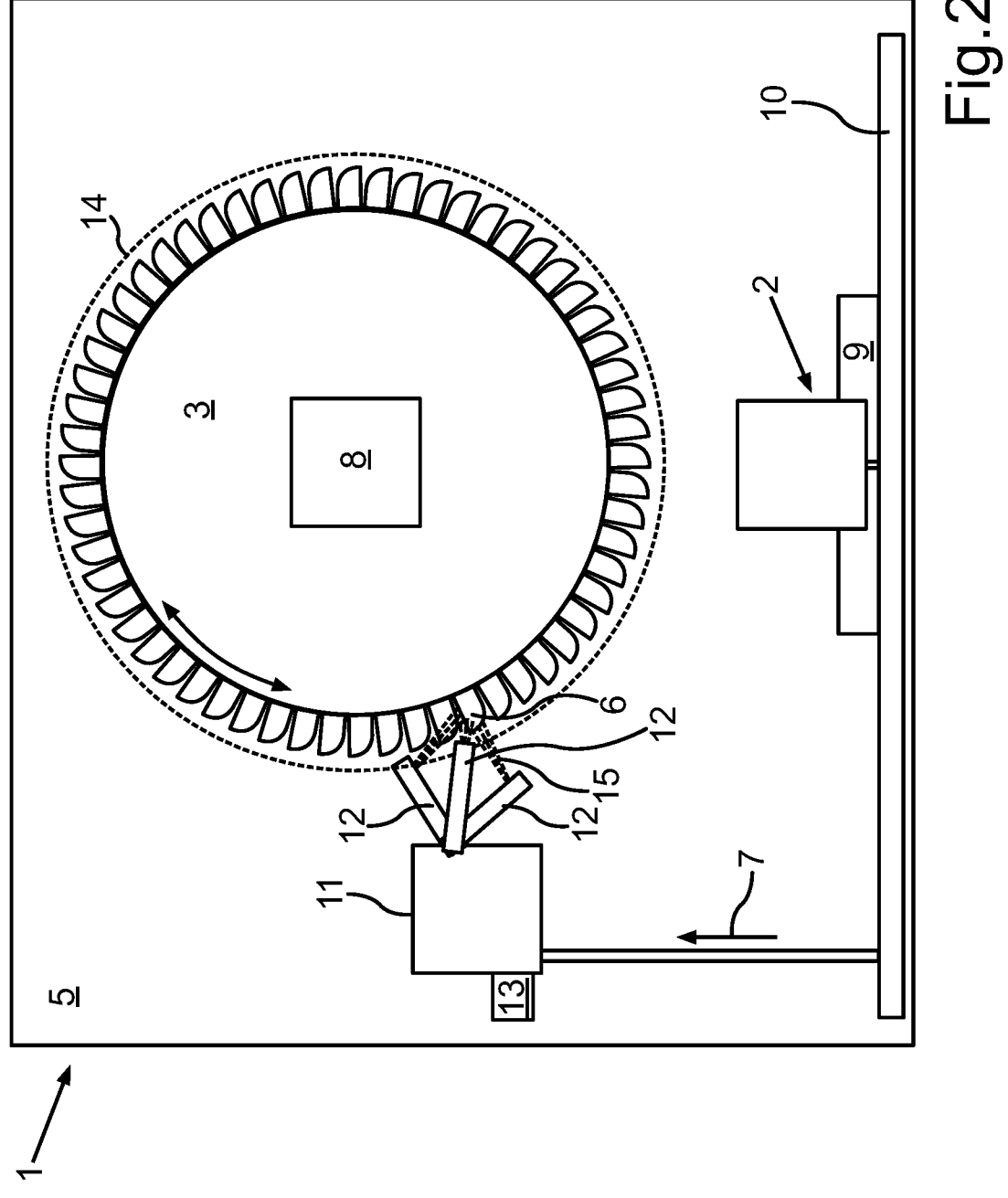
Figure 3:
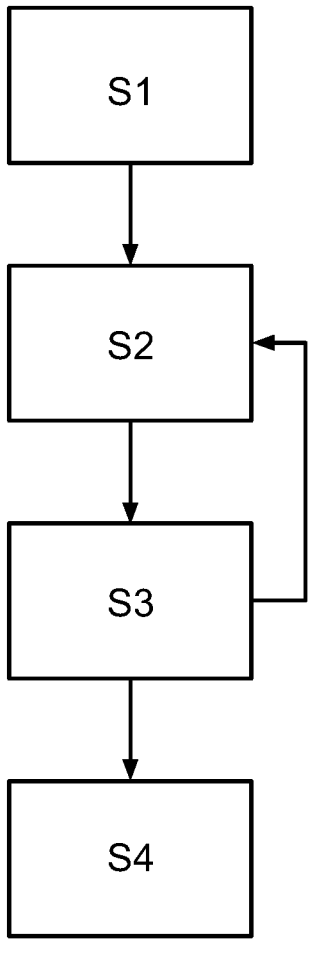

Further features of the invention ensue from the claims, the figures, and the descriptions of the figures. The features and combinations of features described above as well as the features and combinations of features mentioned below in the description of the figures and/or solely in the figures can be used not only in the respectively presented combination, but also in other combinations, without leaving the scope of the invention. Accordingly, the invention also comprises embodiments that are not shown and explained explicitly in the figures, but which ensue and can be produced from the explained embodiments by separate combinations of features. Also to be regarded as disclosed are embodiments and combinations of features that, accordingly, do not have all features of a claim as originally formulated. Beyond this, embodiments and combinations of features, in particular through the embodiments presented above, that go beyond the combinations of features presented in the back-references of the claims or deviate from them are to be regarded as disclosed. Herein:

FIG. 1 shows a schematic illustration of a manufacturing device according to the invention for the electrochemical machining of a component; and FIG. 2 shows another schematic illustration of the manufacturing device according to the invention; and FIG. 3 shows a schematic illustration of a sequence of the method according to the invention for manufacturing a component.

DESCRIPTION OF THE INVENTION

FIG. 1 shows a schematic illustration of a manufacturing device for the electrochemical machining of a component. The manufacturing device 1 can have a machining device 2, which can be set op to remove a material of a component 3 in accordance with a predetermined electrochemical machining method. In particular, the component 3 can be an element of a turbine, such as, for example, a blisk. For removal of the material, it can be provided that the component 3 is arranged in a predetermined material removal position 4 inside of a machine chamber 5 of the manufacturing device 1. The predetermined material removal position 4 can describe a predetermined geometric relation between the component 3 and the machining device 2. It can be provided that, during the machining method, a region 6 of the component, which may involve, for example, a blade of the component 3, is arranged in the machining device 2. During the predetermined machining method, it can be provided that the machining device 2 is poled as the cathode and the component 3 is poled as the anode, while an electrolyte solution 7 is fed through a gap between the component 3 and the machining device 2 in order to wash away the material from the component 3. It can be provided that the component 3 is arranged on an actuator device 8, which can be set up to change the position of the component 3 by way of rotating or shifting the component 3. The machining device 2 can also have a holding device 9, which can be fixed in position or which can change the position of the machining device 2.

The manufacturing device 1 can have a collecting basin, which can be a tank 10 for collecting and/or providing the electrolyte solution 7. During the machining method, the electrolyte solution 7 can be collected in the tank 10 of the manufacturing device 1. After the machining of the component 3 or at least of the region 6 of the component 3, it may be necessary to clean the component 3 or at least the region 6 of the component 3 in order to remove a residue layer that has formed on the component 3 or on the region 6 of the component 1 during the machining method. In order to make this possible, the manufacturing device 1 can have a cleaning device 11, which can have at least one jet-spraying nozzle 12. The cleaning device 11 can be arranged on a holding device 13, which can bear the cleaning device 11 in fixed position or which can be capable of moving it or rotating it in the machine chamber 5 of the manufacturing device 1. The cleaning device 11 can be provided to clean the component 3 or the region 6 of the component by means of jet-spraying the region to be cleaned. As jet-spraying agent, it is possible to use the electrolyte solution 7, which, for example, can be taken from the collecting basin or from another possible common tank 10, so that the cleaning device 11 and the machining device 2 can be fed from the same source.

FIG. 2 shows another schematic illustration of a manufacturing device for the electrochemical machining of a component. Shown is the component 3 in a predetermined cleaning position 14. The cleaning position 14 can describe a predetermined geometric position of the component 3 in relation to the cleaning device 11. In order to attain the cleaning position 14, it can be provided that the component 3 and/or the cleaning device 11 are shifted in position. The cleaning device 11 can be shifted in position, for example, by way of holding device 13, whereas the component 3 can be shifted in position, for example, by way of the holding device 8. If the component 3 is situated in the predetermined cleaning position 14, the cleaning device 11 can emit jets 15 of the electrolyte solution 7 through the jet-spraying nozzles 12, said jets being capable of impinging on the region of the component 3. The respective jet 15 can comprise the electrolyte solution 7 and preferably impinge perpendicularly on the region 6 to be cleaned. In order to be able to clean a plurality of surfaces at different angles, it can be provided that the cleaning device 11 has a plurality of jet-spraying nozzles 12, which are set up to guide the jets 15 in respective different jet-spraying directions onto the component 3 or the region 6. The impinging jets 15 of the electrolyte solution 7 enable the residue layer that may have formed during the machining method to be removed from the component 3 as long as it is still fluid. It can be provided that the manufacturing device 1 is set up to manufacture the component 3 in accordance with a predetermined manufacturing method serially in a plurality of method steps. In order to enable a cleaning of the individual regions 6 in a timely manner, it can be provided that, in succession, a predetermined number of blades are machined as individual regions 6 of the component 3 by the machining device 2. It can be provided that, after the removal of the material for a predetermined number of blades, the component 3 is shifted in position into the predetermined cleaning position 14 in order to clean the blades 6 that have just been machined during the machining method. After the blades in the respective method step have been cleaned, it can be provided that, in the next method step, the component 3 is shifted in position into the predetermined material removal position 4 in order to machine the next blades 6 of the component 3.

FIG. 3 shows a schematic illustration of a sequence of a method for manufacturing a component. It can be provided that, in a first step S1, the component 3 is arranged in the manufacturing device 1. In a step S2, the component 3 can be shifted in position by way of the holding device 8 to a predetermined material removal position 4. Subsequently, material of the component 3 can be removed in accordance with the predetermined machining method by the machining device 2 of the manufacturing device 1. Residues may thereby deposit on the component 3. After conclusion of the material removal, it can be provided that the component 3 is shifted in position to a predetermined cleaning position 14 in order to clean the component 3 by the cleaning device 11. It is possible here for the jet-spraying nozzles 12 of the cleaning device 11 to emit jets 15, as a result of which the residues can be removed. It can be provided that the manufacture of the component 3 occurs in a plurality of steps and another region 6 of the component 3 is machined and cleaned in a next step. For this purpose, the method step S2 and the method step S3 can be repeated for the corresponding other regions 6. It can be provided that, after machining all of the regions 6, the manufacturing method is concluded and, in a step S4, the component 3 can be removed from the manufacturing device 1.

In accordance with the prior art, the processes of manufacturing/machining and cleaning are clearly separate from one another and operations are conducted serially. A hybrid or mixed process is not known. Nor are the equipment and operating agents required for this known.

In electrochemical metal machining, the material component 3 undergoes dissolution in terms of its microstructure in an individual manner. This occurs by a redox reaction of the electrolyte solution 7 with the anode material of the component 3. As the reaction outcome of this chemical reaction, which is necessary for the goal-oriented removal of material, a residue layer adheres to all process-related surfaces. The finished machined component surfaces are also coated with the mentioned deposit. During the manufacturing process, the residues are still nearly fluid, but, after prolonged waiting of longer than 1 hour, the residues dry and a hard crust of residue products, which is undesirable, is formed on the workpiece. According to the prior art at the present time, the complete workpiece, such as, for example, a blisk, is prepared in finished form and, subsequently, is serially shot-peened 15 in another technical department in order to remove the hard residue layer. Easier cleaning variants have not proven to lead to the desired goal, because the residue layer is very hard and strongly adhesive.

Instead of a serial machining and a subsequent cleaning process, a hybrid process has proven to be very helpful and time-saving. Thus, a cleaning device 11 is integrated in the manufacturing device 1 and is fastened permanently to the machine housing and can be positioned relative to a machine coordinate system.

The goal of the process is that, after the manufacture of a defined number of regions 6 of the component, which, for example, can be individual blade elements, a cleaning method proceeds automatically in the manufacturing device 1 without any effort for a renewed setup. In terms of number, 1 to 10 regions 6 can be involved, for example. For the cleaning method, the manufacturing device can move the workpiece to a predetermined cleaning position 14 in a coordinate system of the cleaning device 11 and then the cleaning method can be commenced immediately. On account of the short drying times, it is possible to use as cleaning medium the normal electrolyte solution 7 from the machine chamber 5 and, accordingly, no other media are required. Thus, the residues, which do not adhere strongly, are washed away and, subsequently, the manufacturing method can be continued.

The hybrid approach spares efforts involved in renewed setup and logistics, because the process step of shot peening can be entirely dispensed with for the cleaning. The cleaning device 11 must be adapted to the geometric requirements of the workpiece, so that the jets 15 impinge on the cleaning surfaces as orthogonally as possible.

What is claimed is:

1. A manufacturing device for the electrochemical machining of a turbine component, comprising:

at least one machining device, located in a material removal position within the manufacturing device, wherein the at least one machining device removes material of the turbine component when located at the material removal position, to provide a machined turbine component in accordance with a predetermined electrochemical machining method using an electrolyte solution from a tank thereby leaving a liquid residue layer on the machined turbine component, at least one cleaning device, located in a cleaning position within the manufacturing device, wherein the cleaning position is different from the material removal position, and wherein the at least one cleaning device is configured and arranged to spray jets of the electrolyte solution from the tank onto the machined turbine component moved into the cleaning position in accordance with a predetermined jet-spraying method to remove the liquid residue layer formed on the machined turbine component during the predetermined electrochemical machining method.

2. The manufacturing device according to claim 1, wherein the manufacturing device shifts in position and/or rotates the turbine component and/or the machining device to arrange the turbine component in the material removal position in relation to the machining device.

3. The manufacturing device according to claim 1, wherein the manufacturing device shifts in position and/or rotates the machined turbine component and/or the cleaning device in order to arrange the machined turbine component in the cleaning position in relation to the cleaning device.

4. The manufacturing device according to claim 1, wherein the cleaning device comprises at least one jet-spraying nozzle, which sprays jets, at least one jet, of the electrolyte solution on predetermined regions of the machined turbine component.

5. The manufacturing device according to claim 4, wherein the cleaning device comprises at least two jet-spraying nozzles, wherein the jet-spraying nozzles are aligned with respect to each other wherein the jet-spraying directions of the respective jets differ from each other.

6. The manufacturing device according to claim 1, wherein the manufacturing device rotates the component during the predetermined electrochemical machining method and/or the machined turbine component during the predetermined cleaning method around at least one predetermined axis in space.

7. The manufacturing device according to claim 1, wherein the machining device, the cleaning device, and the component are arranged in a machine chamber of the manufacturing device.

8. The manufacturing device according to claim 1, wherein the cleaning device changes the alignment or positioning of at least one of the jet-spraying nozzles.

9. The manufacturing device of claim 1, wherein the at least one cleaning device is configured and arranged to spray jets of the electrolyte solution from the tank orthogonally into a surface of the machined turbine component to remove the liquid residue layer formed on the machined turbine component during the predetermined electrochemical machining method.

* * * * *